(12) United States Patent
Stoia et al.

(10) Patent No.: US 8,661,823 B2
(45) Date of Patent: Mar. 4, 2014

(54) INTEGRAL FLANGE CONNECTION FUEL NOZZLE BODY FOR GAS TURBINE

(75) Inventors: Lucas John Stoia, Taylors, SC (US); Keith Cletus Belsom, Laurens, SC (US); Seth Reynolds Hoffman, Greenville, SC (US)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 12/652,142

(22) Filed: Jan. 5, 2010

(65) Prior Publication Data
US 2011/0162372 A1    Jul. 7, 2011

(51) Int. Cl.
  *F02C 1/00* (2006.01)
(52) U.S. Cl.
  USPC .......................................................... 60/740
(58) Field of Classification Search
  USPC ........... 60/740, 734, 737, 739, 742, 743, 746, 60/747, 796, 800; 239/423, 432, 589, 588, 239/600; 277/591
  See application file for complete search history.

(56) References Cited

U.S. PATENT DOCUMENTS

| | | | | |
|---|---|---|---|---|
| 3,458,997 A * | 8/1969 | Clark | ............... | 60/739 |
| 3,516,252 A * | 6/1970 | Beane et al. | ............... | 60/739 |
| 4,154,056 A * | 5/1979 | Emory | ............... | 60/796 |
| 4,268,017 A * | 5/1981 | Cole | ............... | 266/265 |
| 4,365,470 A * | 12/1982 | Matthews et al. | ............... | 60/800 |
| 4,441,323 A * | 4/1984 | Colley | ............... | 60/737 |
| 4,466,240 A * | 8/1984 | Miller | ............... | 60/796 |
| 4,891,935 A * | 1/1990 | McLaurin et al. | ............... | 60/800 |
| 4,938,418 A * | 7/1990 | Halvorsen | ............... | 239/5 |
| 5,031,407 A * | 7/1991 | Zaremba et al. | ............... | 60/739 |
| 5,054,247 A * | 10/1991 | Rhoades et al. | ............... | 451/36 |
| 5,079,911 A * | 1/1992 | Kumakura | ............... | 60/39.511 |
| 5,220,794 A * | 6/1993 | Sledd et al. | ............... | 60/737 |
| 5,228,283 A * | 7/1993 | Sciocchetti | ............... | 60/775 |
| 5,316,346 A * | 5/1994 | Maurer | ............... | 285/23 |
| 5,361,578 A * | 11/1994 | Donlan | ............... | 60/800 |
| 6,374,594 B1 * | 4/2002 | Kraft et al. | ............... | 60/39.37 |
| 7,690,203 B2 * | 4/2010 | Bland | ............... | 60/737 |
| 7,712,313 B2 * | 5/2010 | Kojovic et al. | ............... | 60/740 |
| 2005/0223709 A1 * | 10/2005 | Bleeker | ............... | 60/737 |
| 2007/0151255 A1 * | 7/2007 | Johnson et al. | ............... | 60/776 |
| 2011/0089267 A1 * | 4/2011 | Stoia et al. | ............... | 239/589 |

* cited by examiner

*Primary Examiner* — Phutthiwat Wongwian
(74) *Attorney, Agent, or Firm* — Nixon & Vanderhye, P.C.

(57) ABSTRACT

A fuel nozzle for a gas turbine includes a fuel nozzle body or endcover. The fuel nozzle body or endcover includes at least one seal surface. The fuel nozzle also includes at least one flexible hose and at least one flange connected to the flexible hose. The at least one flange is fastened to the fuel nozzle body at the at least one seal surface.

9 Claims, 4 Drawing Sheets

INTEGRAL FLANGE CONNECTION FUEL NOZZLE BODY FOR GAS TURBINE

The present invention relates to a fuel nozzle body or endcover that has integral flange connections.

BACKGROUND OF THE INVENTION

Referring to FIGS. 1 and 2, a secondary fuel nozzle according to the prior art comprises a secondary fuel nozzle body 2 and fuel piping 4 welded to the nozzle body 2. The fuel piping 4 comprises a plurality of pipes and each pipe includes a flange 6. As shown in FIG. 2, the fuel piping 4 is connected to flexible hoses 10. The flexible hoses 10 each include a flange 8 that is connected to the flange 6 of a respective fuel pipe 4.

The welded fuel piping 4 is susceptible to high cycle fatigue cracks due to vibration. The flange 6 to flange 8 connection presents a cantilevered mass that has a given natural frequency. Gas turbine rotor vibrations cause high amplitude response of the piping 4 resulting in cracks in the welds between the piping 4 and the fuel nozzle body 2. There is also a potential for high cycle fatigue initiation during unit startup.

Prior attempts to solve these problems included increasing robustness of welds adjoining the piping to the nozzle, changing from slip-on to weld neck flanges, adding weld adapters to increase strength of life limiting weld, and in extreme cases adding welded bracing fixtures to stiffen the piping.

BRIEF DESCRIPTION OF THE INVENTION

According to an embodiment of the invention, a fuel nozzle for a gas turbine comprises a fuel nozzle body or endcover, the fuel nozzle body or endcover comprising at least one seal surface; at least one flexible hose; and at least one flange connected to the flexible hose, wherein the at least one flange is fastened to the fuel nozzle body at the at least one seal surface.

DETAILED DESCRIPTION OF THE INVENTION

Figure 1:
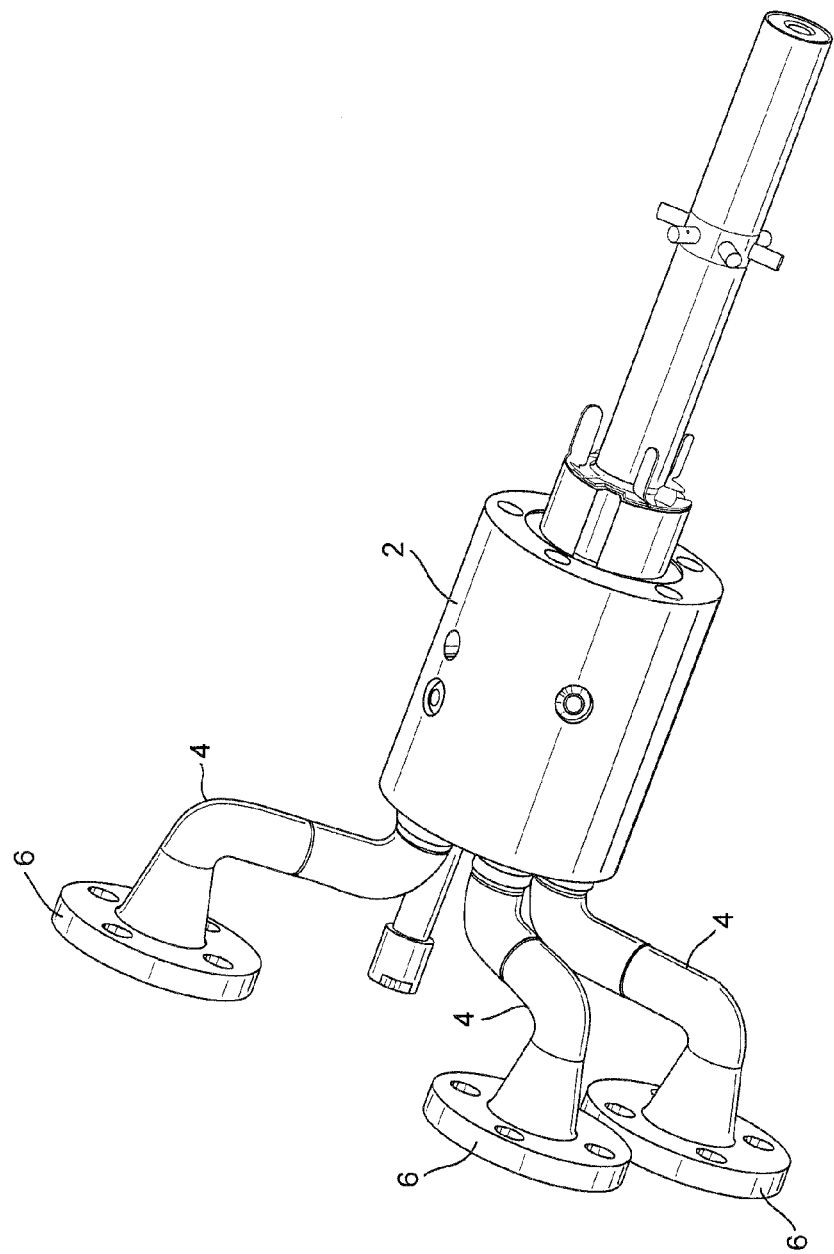
FIG. 1 is a schematic perspective view of a secondary fuel nozzle and fuel piping according to the prior art.
Figure 2:
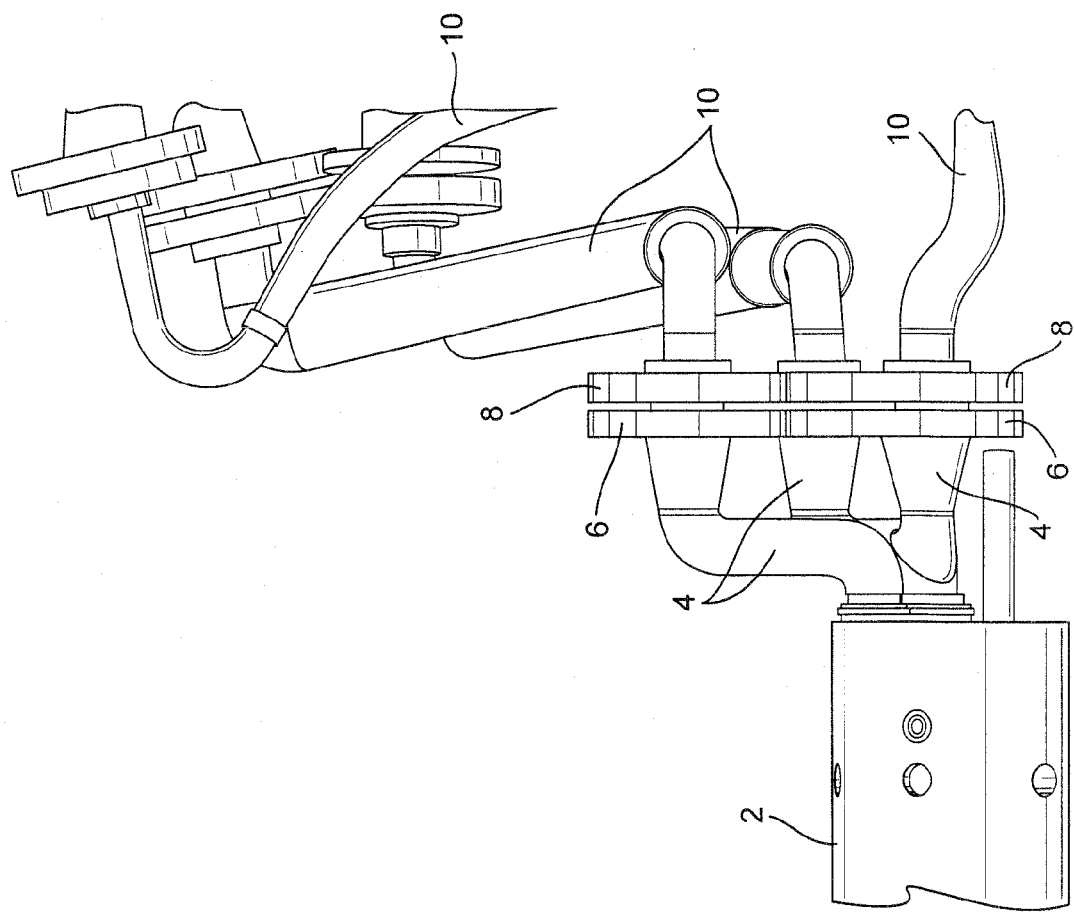
FIG. 2 is a schematic view of the secondary fuel nozzle and fuel piping connected to flexible hoses.
Figure 3:
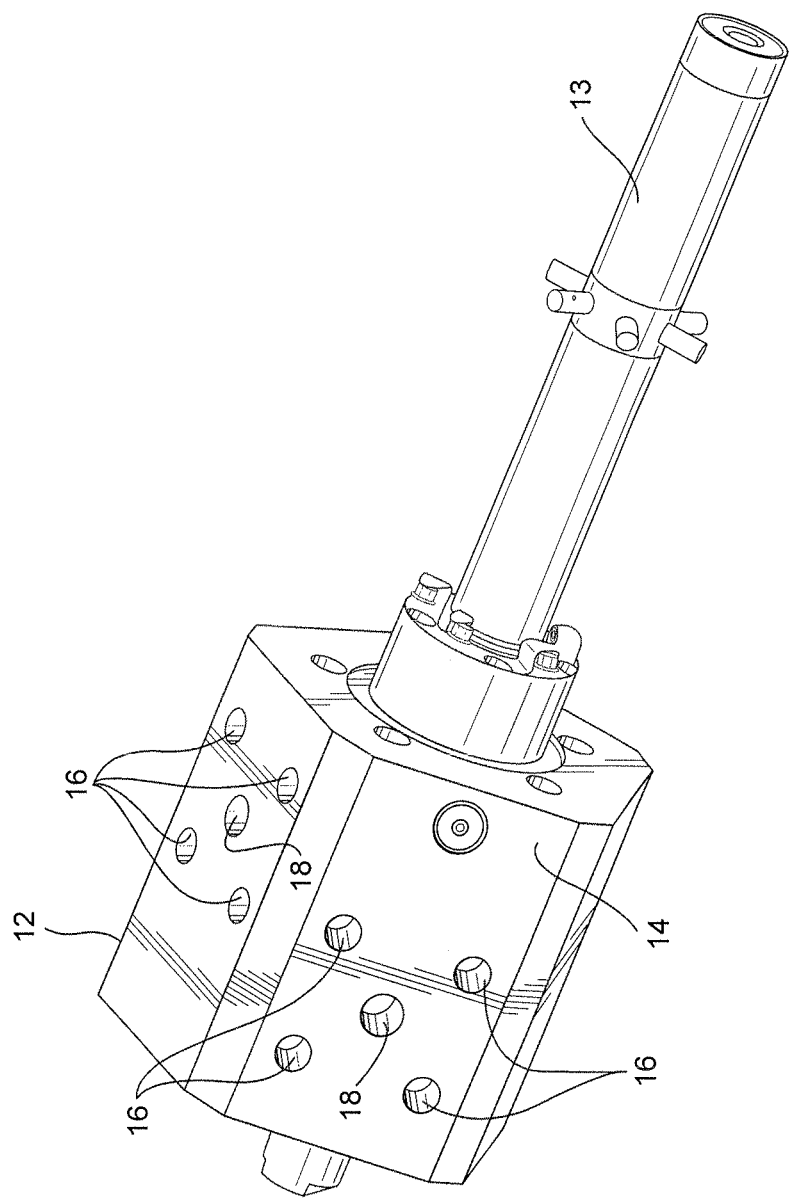
FIG. 3 is a schematic perspective view of a secondary fuel nozzle according to an embodiment of the invention.

Referring to FIG. 3, a secondary fuel nozzle assembly comprises a secondary fuel nozzle body 12 at an upstream end of a nozzle barrel 13. The face of the fuel nozzle body 12 is machined with a lay finish 14, i.e. a pattern created by a repetitive impression on the surface of a part. The lay finish may be a circumferential, or circular, lay finish about the center of the fluid port 18. This provides an appropriate seal surface for a flange gasket.

The face of the fuel nozzle body or endcover 12 includes threaded holes 16 provided in a pattern machined on the flat faces of the fuel nozzle body or endcover. The threaded holes 16 may be tapped into the surface of the fuel nozzle body or endcover and be configured to receive bolts (not shown) for fastening flanges of flexible hoses to the fuel nozzle body or endcover.

Figure 4:
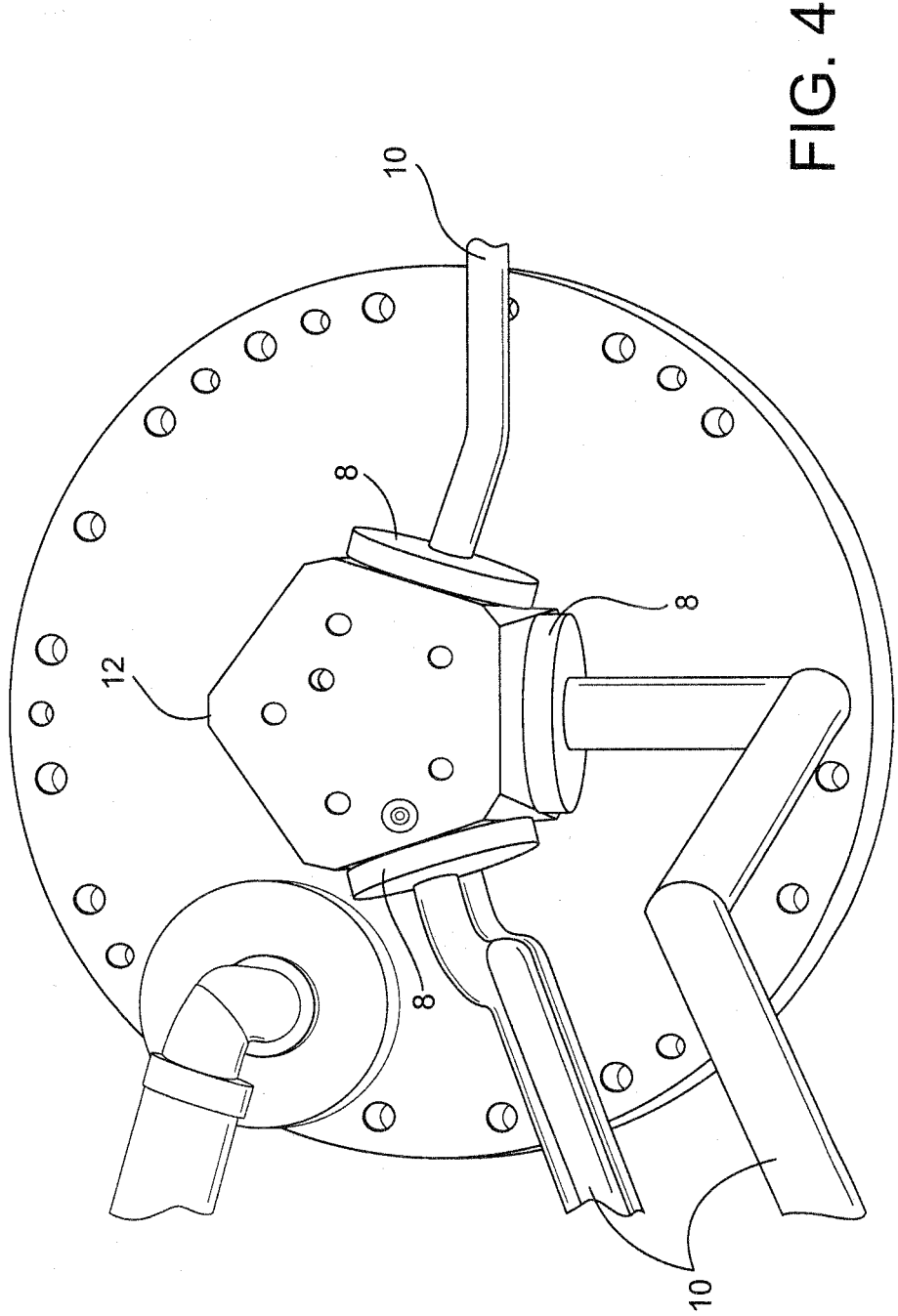
FIG. 4 is a schematic view of the secondary fuel nozzle of FIG. 3 connected to flexible hoses.

Although the fuel nozzle body or endcover 12 is shown as pentagonal, it should be appreciated that other polygonal configurations of the fuel nozzle body or endcover may be used. It should also be appreciated that although three flexible hoses are shown in FIG. 4, more or fewer flexible hoses may be connected to the fuel nozzle body or endcover. In addition, although the pattern of the threaded holes 16 is shown as generally square, it should be appreciated that other patterns may be used. Furthermore, it should be appreciated that the holes 16 may not be threaded, but may be configured to receive fasteners other than threaded fasteners.

Referring to FIG. 4, flexible hoses 10 are connected directly to the fuel nozzle body or endcover 12 by fasteners, e.g. bolts, that fasten flanges 8 to the seal surface 14 of the fuel nozzle body or endcover 12. Because the flexible hoses 10 are fastened (e.g. bolted) directly to the fuel nozzle body or endcover 12, there is no significant cantilevered mass. The flexible hose flanges 8 are connected to the considerably stiff fuel nozzle body or endcover 12. This reduces response amplitudes experienced by the flexible hoses and improves the durability of the flexible hoses.

The secondary fuel nozzle provides improved robustness and reliability. The secondary fuel nozzle design eliminates features susceptible to high cycle fatigue. Additionally, the vibration characteristics of the flexible hose—fuel nozzle/endcover system are improved. The secondary fuel nozzle thus improves the durability of the flexible hoses as well.

The secondary fuel nozzle meets original commercial life requirements and reduces component cost. The secondary fuel nozzle protects higher cost components (e.g. the endcover or fuel nozzle body) by having the life limiting location moved to the flexible hoses.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel nozzle for a gas turbine, comprising:
    a fuel nozzle body or endcover, the fuel nozzle body or endcover comprising at least one seal surface;
    at least one flexible hose;
    at least one flange connected to the at least one flexible hose, wherein the at least one flange is fastened to the fuel nozzle body at the at least one seal surface; and further
    wherein the fuel nozzle body or endcover is polygonal, and the at least one seal surface comprises a plurality of seal surfaces provided on each side of the fuel nozzle body or endcover.

2. A fuel nozzle according to claim 1, wherein the at least one flexible hose comprises a plurality of flexible hoses and the at least one flange comprises a plurality of flanges.

3. A fuel nozzle according to claim 2, wherein the plurality of flexible hoses and the plurality of flanges do not correspond to the number of sides of the polygonal fuel nozzle body.

4. A fuel nozzle according to claim 1, wherein at least one gasket is provided between the at least one flange and the at least one seal surface.

5. A fuel nozzle according to claim 1, wherein the fuel nozzle body or endcover comprises at least one fastener aperture configured to receive at least one fastener to fasten the at least one flange to the at least one seal surface.

6. A fuel nozzle according to claim 5, wherein the at least one fastener aperture comprises at least one threaded aperture.

7. A fuel nozzle according to claim 6, wherein the at least one fastener comprises at least one bolt.

8. A fuel nozzle according to claim 1, wherein the at least one seal surface comprises a lay finish.

9. A fuel nozzle according to claim 8, wherein the lay finish comprises a circular lay finish about a center of a fuel port provided on the at least one seal surface.

\* \* \* \* \*